June 24, 1958 — R. A. AMMON — 2,840,767
MOVING COIL INSTRUMENT
Filed Oct. 5, 1953
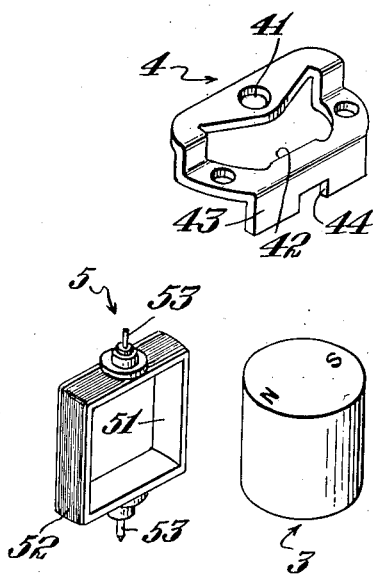
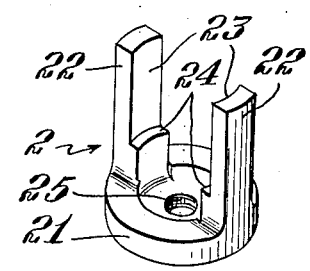
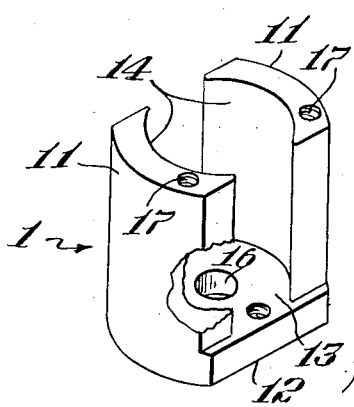
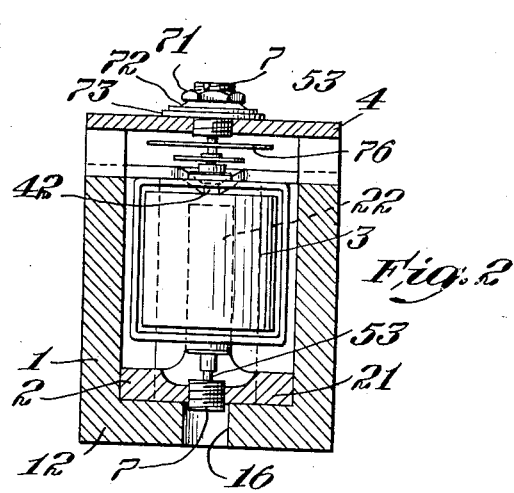
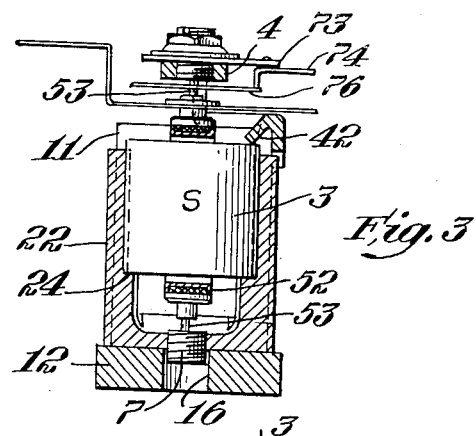
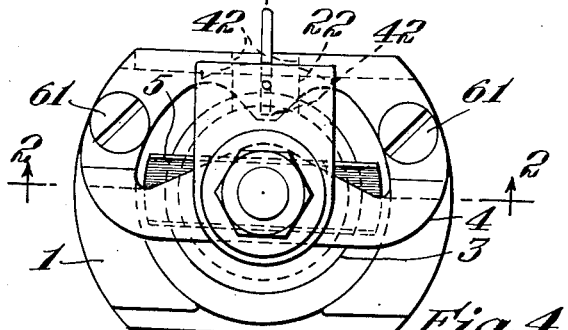
Fig. 1  Fig. 2  Fig. 3  Fig. 4
Inventor
Roscoe A. Ammon
by Roberts, Cushman & Grover
Att'ys.

United States Patent Office 2,840,767
Patented June 24, 1958

2,840,767
MOVING COIL INSTRUMENT

Roscoe A. Ammon, Manchester, N. H.

Application October 5, 1953, Serial No. 384,134

17 Claims. (Cl. 317—166)

The present invention relates to electrical instruments and particularly to field assemblies for moving coil instruments such as meters and sensitive relays.

Instruments of this general type comprise a yoke and core assembly, either the yoke or core being magnetized and the other providing a magnetic flux path for concentrating the magnetic field in an air gap between the yoke and core. Usually a bracket is provided for positioning the core relative to the yoke so that a coil, supported on bearings, may rotate in the air gap.

While such assemblies have been generally satisfactory in large instruments, they lack rigidity and precise location of the coil and bearings when miniaturized. If the aforesaid bracket is to be of suitably small size it is difficult to manufacture with the accuracy necessary to align the core and is not sufficiently resistant to shock or mishandling to prevent misalignment of the core.

Accordingly, one object of the present invention is to provide a novel field assembly which may be economically manufactured with high accuracy and in which the relation of the parts affords greatly improved resistance to damage or misalignment. A further object is to provide a structure which is assembled with a minimum of attaching means such as screws, welds or solder.

In a broad aspect the field assembly comprises a yoke, preferably a relatively rugged U-shaped block, having opposed pole faces and a transverse base, a frame having at one end a base portion which is telescopically received and confined between the pole faces and which abuts the transverse yoke base, the frame having a socket telescopingly receiving the core and abutting one end of the core, and a bridge member secured to the yoke and having means abutting the other end of the core whereby the core and frame are confined to the yoke without being directly secured to the yoke. Such a field assembly is particularly suited for combination with a moving coil mounted between bearings on the bridge and frame base respectively. The aforesaid pole faces and frame base may be concentrically curved, as by a machining process, so as to confine the frame and position it coaxially of the yoke and bridge bearing. Similarly the socket and core are concentrically curved on the same axis as the pole faces and the bearings so that both the frame and the core are confined, positioned and protected by a telescoping fit within the yoke and frame respectively. Preferably both the yoke and frame are of U-shape cross section and comprise opposed legs forming the aforesaid cylindrical sockets.

In a further aspect the bridge has hold-down means such as a spring finger abutting one end of the core to confine the core and frame in the yoke. More specifically the frame and bridge respectively have interengaging means preventing rotation of the bridge relative to the yoke thereby to hold the legs of the frame circumferentially offset from the legs of the yoke.

For the purpose of illustration a typical embodiment of the invention is shown in the drawings in which Fig. 1 is an exploded isometric view;

Figs. 2 and 3 are sections on lines 2—2 and 3—3 respectively of Fig. 4;

Fig. 4 is a plan view of an assembled instrument.

As shown in Fig. 1 the instrument comprises a yoke 1, a non-magnetic frame 2, a magnetized core 3 having poles N and S, a bridge 4 and a moving coil 5. The yoke is U-shaped and has two posts or legs 11 extending from a transverse member 12 having a planar face 13. The legs or pole pieces 11 have faces 14 curved concentrically with an axis to be described more fully hereinafter. In the transverse member 12 is formed an access opening 16.

The frame 2, similarly to the yoke 1 comprises a transverse member or base portion 21 from which posts or legs 22 extend so as to form a generally U-shaped configuration. Curved faces 23 on the legs 22 and shoulders 24 form a cylindrical socket within which the magnetized core 3 may be seated on shoulders 24 above the base 21. A circular opening 25 concentric with the curved faces 23 of the legs 22 is threaded to receive a conventional jewel bearing screw 7.

The curved faces 14 of the yoke 1, the base 21, the faces 23 of the yoke and the bearing opening 25 are formed, preferably by machining, concentric with a single axis, namely the axis of the core 3. The frame base 21 and the yoke faces 14 are substantially of the same diameter so that the base 21 fits snugly between the faces 14 and rests on the transverse space 13. Similarly the faces 23 of the frame 2 are substantially of the same diameter as the core 3 so that the latter fits snugly within the socket formed by said faces and is precisely positioned coaxially with the bearing opening 25.

The above described field assembly is locked in assembled condition by attaching the bridge 4 to the yoke 1 by means of screws 61 engaging threaded openings 17 in the legs 11 of the yoke 1. The bridge 4 has a threaded bore 41 for receiving a bearing screw like that in the opening 25 of the frame 2.

The coil 5 comprising a form 51 around which are wound turns of wire 52 carries pivot staffs 53 which engage in the jewel bearings 7. The opening 16 in the yoke 1 provides access to the lower bearing screw 7 in the base 21 of the non-magnetic frame 2 as shown in Figs. 2 and 3.

When the field assembly and coil are assembled as shown in Figs. 2 to 4, the core 3, and the frame 2 are securely held in place by the bridge 4 and screws 61. The bridge 4 has a slightly resilient spring finger 42 turned down so as to bear on the core 3, thereby pressing the core 3 against the frame 2 and holding the core and frame in the yoke 1 without any direct attachment between the core, frame and yoke. The bridge is also provided with a turned down flange 43 in which is formed a slot 44 receiving one of the legs 22 of the frame 2 and holding the frame against rotation relative to the yoke 1.

The upper bearing screw 7 is locked in position by a nut 71, a washer 72 and a plate 73. The plate 73 carries an adjusting lever 24 which connects with one end of a coiled spring 76, the other end of the coil spring being connected to the upper pivot staff 53 as is conventional in the meter art.

Because the yoke may be machined from a rigid iron block, and because its pole faces shield a considerable portion of the core and frame circumference, the block reinforces the frame and protects it from dislocation. This is accomplished, however, without intricate or delicate connections between the various parts and the yoke. Only two screws through the bridge are required to hold the parts in assembly, the rugged nature of the assembly being provided by the novel interfitting of the parts.

It should be understood that the present disclosure is for the purpose of illustration only and that this invention includes all modifications and equivalents which fall within the scope of the appended claims.

I claim:

1. A field assembly for an electrical instrument comprising a core, a yoke having opposed pole faces and a transverse face integral with the yoke and normal to said faces, a unitary frame having at one end a base portion telescopingly received and confined between said pole faces and abutting said transverse face, said frame having a socket telescopingly receiving and abutting one end of said core, and a hold down member secured to said yoke and having means abutting the other end of said core thereby to confine said core and frame in said yoke.

2. A field assembly for an electrical instrument comprising a cylindrical core, a yoke having opposed pole faces and a transverse face integral with the yoke and normal to said faces, a unitary frame having at one end a base portion telescopingly received between said pole faces and abutting said transverse face, said pole faces and frame base being concentrically curved and of substantially the same diameter so that said faces radially confine said frame and position it coaxially of the yoke, said frame having a socket telescopingly receiving and abutting one end of said core, and a hold down member secured to said yoke and having means abutting the other end of said core thereby to confine said core and frame in said yoke.

3. A field assembly for an electrical instrument comprising a cylindrical core, a yoke having opposed pole faces and a transverse face integral with the yoke and normal to said faces, a unitary frame having at one end a base portion telescopingly received between said pole faces and abutting said transverse face, said pole faces and frame base being concentrically curved and of substantially the same diameter so that said faces radially confine said frame and position it coaxially of the yoke, said frame having a socket telescopingly receiving and abutting one end of said core, said socket and core having concentrically curved opposed surfaces of substantially the same diameter so that said frame radially confines said core and positions it coaxially of said frame and yoke, and a hold down member secured to said yoke and having means abutting the other end of said core thereby to confine said core and frame in said yoke.

4. A field assembly for an electrical instrument comprising a core, a yoke of U-shaped cross section having opposed pole faces and a transverse face integral with the yoke and normal to said faces, a unitary frame of U-shaped cross section having at one end a base portion telescopingly received and confined between said pole faces and abutting said transverse face, said frame having a socket telescopingly receiving and abutting one end of said core, and a hold down member secured to said yoke and having means abutting the other end of said core thereby to confine said core and frame in said yoke.

5. A field assembly for an electrical instrument comprising a cylindrical magnet core, a yoke having opposed pole faces and a transverse face integral with the yoke and normal to said faces, a unitary frame having at one end a base portion telescopingly received and confined between said pole faces and abutting said transverse face, said frame having a cylindrical socket telescopingly receiving and abutting one end of said core, a hold down member secured to said yoke and having means abutting the other end of said core thereby to confine said core and frame in said yoke, and interengaging means on said frame and hold down member, respectively, preventing rotation of said frame relative to said yoke.

6. A field assembly for an electrical instrument comprising a core, a yoke having opposed pole faces and a transverse face integral with the yoke and normal to said faces, a unitary frame having at one end a base portion telescopingly received and confined between said pole faces and abutting said transverse face, said frame having a socket telescopingly receiving and abutting one end of said core, and a hold down member secured to said yoke and having a spring finger abutting the other end of said core thereby to confine said core and frame in said yoke.

7. A field assembly for an electrical instrument comprising a cylindrical core, a yoke, a unitary frame and a bridge member, said yoke and frame comprising nesting members each having opposed legs forming a cylindrical socket and a base portion connecting said legs, the frame base portion being of substantially the same diameter as the yoke socket, and the frame socket being substantially of the same diameter as said core, said bridge being secured to said yoke and including means abutting said core to hold said frame and core in nested position, bearing means on said bridge and frame member disposed coaxially with said yoke, and a moving coil pivotally mounted between said bearing means and around said core, said yoke and frame being coaxially machined whereby said core is precisely positioned coaxially with said moving coil.

8. A field assembly for a moving coil electrical instrument comprising a core having cylindrical faces, a yoke having means forming opposed pole faces and a transverse portion at one end integral with and normal to said pole faces and including means forming a socket at said end, a unitary frame having at one end a base including means fitting in said yoke socket and means forming a second socket with cylindrical faces slidingly receiving said core faces.

9. A field assembly for a moving coil electrical instrument comprising a core having cylindrical faces, a yoke having means forming opposed pole faces and a transverse portion at one end integral with and normal to said pole faces and including means forming a socket at said end, and a unitary frame having at one end a base including means fitting in said yoke socket and posts extending normal to said base substantially the length of said core faces, said posts forming a second socket with cylindrical faces snugly receiving said core faces.

10. A field assembly for a moving coil electrical instrument comprising a core having cylindrical faces, a yoke having means forming opposed pole faces and a transverse portion at one end integral with and normal to said pole faces and including means forming a socket at said end, a unitary frame having at one end a base including means fitting in said yoke socket and posts extending normal to said base substantially the length of said core faces, said posts forming a second socket with cylindrical faces snugly receiving said core faces, and means abutting one end of the core to hold the same in said second socket.

11. A field assembly for a moving coil electrical instrument comprising a core having cylindrical faces, a yoke having means forming opposed pole faces and a transverse portion at one end integral with and normal to said pole faces and including means forming a socket at said end, a unitary frame having at one end a base including means fitting in said yoke socket and posts extending normal to said base substantially the length of said core faces, said posts forming a second socket with cylindrical faces snugly receiving said core faces, and mounting means attached to said yoke including a bridge member and a support member extending from one of said frame posts to said bridge.

12. A field assembly for a moving coil electrical instrument comprising a core having cylindrical faces, a yoke having means forming opposed pole faces and a transverse portion at one end integral with and normal to said pole faces and including forming a socket at said end, a unitary frame having at one end a base including means fitting in said yoke socket and posts extending normal to said base substantially the length of said core faces, said posts forming a second socket with cylindrical faces snugly receiving said core faces and an abutment extending inwardly from one of said post faces limiting entry of the core in the socket.

13. A field assembly for a moving coil electrical instrument comprising a core having cylindrical faces, a yoke having means forming opposed pole faces and a transverse portion at one end integral with and normal to said pole faces and including means forming a socket at said end, a unitary frame having at one end a base including means fitting in said yoke socket and posts extending normal to said base substantially the length of said core faces, said posts forming a second socket with cylindrical faces snugly receiving said core faces, and slidingly interfitting means on said yoke and frame for guiding said frame into said yoke socket.

14. An assembly for a moving coil electrical instrument comprising a core having cylindrical faces, a yoke having means forming opposed pole faces and a transverse portion at one end integral with and normal to said pole faces and including means forming a socket at said end, a unitary frame having at one end a base including means fitting in said yoke socket and posts extending normal to said base at least the length of said core faces, said posts forming a second socket with cylindrical faces snugly receiving said core faces, a coil having oppositely directed bearing staffs, bearing means in said frame base receiving one of the staffs, second bearing means receiving the other staff, and a support member extending between one of said frame posts and said second bearing means.

15. An assembly for a moving coil electrical instrument comprising a core having cylindrical faces, a yoke having means forming opposed pole faces and a transverse portion at one end integral with and normal to said pole faces and including means forming a socket at said end, a unitary frame having at one end a base including means fitting in said yoke socket and posts extending normal to said base at least the length of said core faces, said posts forming a second socket with cylindrical faces snugly receiving said core faces, a coil having oppositely directed bearing staffs, bearing means in said frame base receiving one of the staffs, second bearing means receiving the other staff, a support member extending between one of said frame posts and said second bearing means, and means for attaching said member to said yoke thereby to secure said frame, core and coil in said yoke.

16. An assembly for a moving coil electrical instrument comprising a core having cylindrical faces, a yoke having means forming opposed pole faces and a transverse portion at one end integral with and normal to said pole faces and including means forming a socket at said end, a unitary frame having at one end a base including means fitting in said yoke socket and posts extending normal to said base at least the length of said core faces, said posts forming a second socket with cylindrical faces snugly receiving said core faces, a coil having oppositely directed bearing staffs, bearing means in said frame base receiving one of the staffs, second bearing means receiving the other staff, a support member extending between one of said frame posts and said second bearing means, means for attaching said member to said yoke thereby to secure said frame, core and coil in said yoke, and means on said member engaging one end of the core to hold the same in said frame socket.

17. An assembly for a moving coil electrical instrument comprising a core having cylindrical faces, a U-shaped yoke of magnetic material having posts forming opposed coaxially curved pole faces and a transverse portion at one end integral with and normal to said posts and including means forming a socket at said end, a unitary, non-magnetic U-shaped frame having at one end a base including means fitting in said yoke socket and posts extending normal to said base within said yoke substantially the axial length of said core, an abutment extending inwardly of one of said frame posts, said frame posts having coaxially curved surfaces which with said abutment form a socket snugly receiving said core faces, a coil having oppositely directed bearing staffs, bearing means in said frame base receiving one of the staffs, second bearing means for receiving the other staff, a bridge member carrying said second bearing means, a support member abutting the ends of said yoke posts and extending between one of said frame posts and said bridge member, means on said support member engaging one end of the core to secure the same in the frame socket, and means for attaching said support member to said yoke.

References Cited in the file of this patent

UNITED STATES PATENTS

| | | |
|---|---|---|
| 397,966 | Carey | Feb. 19, 1889 |
| 1,927,346 | Lawrence | Sept. 19, 1933 |
| 2,306,213 | Grave | Dec. 22, 1942 |
| 2,380,187 | Mehring | July 10, 1945 |
| 2,499,326 | O'Brien | Feb. 28, 1950 |